United States Patent
Tang et al.

(10) Patent No.: US 6,988,248 B1
(45) Date of Patent: *Jan. 17, 2006

(54) ANIMATED INDICATORS THAT REFLECT FUNCTION ACTIVITY OR STATE OF OBJECTS DATA OR PROCESSES

(75) Inventors: John Tang, Palo Alto, CA (US); Chris Ryan, Mountain View, CA (US); Trevor Morris, Mountain View, CA (US); Ellen Isaacs, Sunnyvale, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1026 days.

(21) Appl. No.: 08/885,597

(22) Filed: Jun. 30, 1997

(51) Int. Cl.
  G06F 3/00 (2006.01)
  G06T 13/00 (2006.01)
(52) U.S. Cl. ............. 715/839; 715/753; 715/759; 715/821; 715/709; 715/838; 345/473
(58) Field of Classification Search ......... 715/769, 715/821–824, 835–839, 846, 847, 709, 861, 715/859, 753, 759, 526, 530, 539; 345/473, 345/769, 859, 861, 835–839, 846, 847, 329, 345/2, 977, 978, 821–824, 709, 348, 349; 709/217–219, 200, 204; 704/271; 395/701; 364/138, 188
See application file for complete search history.

(56) References Cited

U.S. PATENT DOCUMENTS

| | | | | |
|---|---|---|---|---|
| 4,638,298 A | | 1/1987 | Spiro | |
| 4,785,420 A | * | 11/1988 | Little | 704/271 |
| 5,278,347 A | * | 1/1994 | Konishi | 84/613 |
| 5,479,602 A | | 12/1995 | Baecker et al. | 395/159 |
| 5,623,652 A | * | 4/1997 | Vora et al. | 707/10 |
| 5,680,619 A | * | 10/1997 | Gudmundson | 395/701 |
| 5,721,908 A | * | 2/1998 | Lagarde | 345/329 |

(Continued)

FOREIGN PATENT DOCUMENTS

JP  408161137 A * 6/1996

OTHER PUBLICATIONS

"STN Express 4.0 a" American Chemical Society, Hampden Data Services, and Trustees of Columbia University in the City of New York, 1996.*

(Continued)

*Primary Examiner*—Kristine Kincaid
*Assistant Examiner*—Lê Nguyen
(74) *Attorney, Agent, or Firm*—Finnegan, Henderson, Farabow, Garrett & Dunner, LLP

(57) ABSTRACT

Animated indicators monitor the state of a software container and reflect the state of the container, potentially including information such as amount, type, and activity of the container. As the state of the container changes, an animation routine accordingly changes. Users are presented with up-to-date and detailed information about a container represented by a small graphic pictorial. Thus, the user receives a continuous supply of useful information about the container without having to specifically select and view the container as a full screen representation.

3 Claims, 6 Drawing Sheets

U.S. PATENT DOCUMENTS

| | | | | |
|---|---|---|---|---|
| 5,764,901 A | * | 6/1998 | Skarbo et al. | 709/204 |
| 5,793,366 A | * | 8/1998 | Mano | 345/349 |
| 5,831,617 A | * | 11/1998 | Bhukhanwala | 345/349 |
| 5,847,708 A | * | 12/1998 | Wolff | 345/349 |
| 5,848,246 A | * | 12/1998 | Gish | 709/228 |
| 5,880,729 A | * | 3/1999 | Johnston | 345/977 |
| 5,930,792 A | * | 7/1999 | Polcyn | 707/9 |
| 5,978,840 A | * | 11/1999 | Nguyen et al. | 709/217 |
| 6,160,551 A | * | 12/2000 | Naughton et al. | 345/339 |

OTHER PUBLICATIONS

Richard Gallagher, Computer Visualization: Graphics Techniques for Scientific and Engineering Analysis, CRC Press: Ann Arbor, 1995.*

Baecker, et al., "Bringing Icons to Life," 1991, pp. 1-6.

* cited by examiner

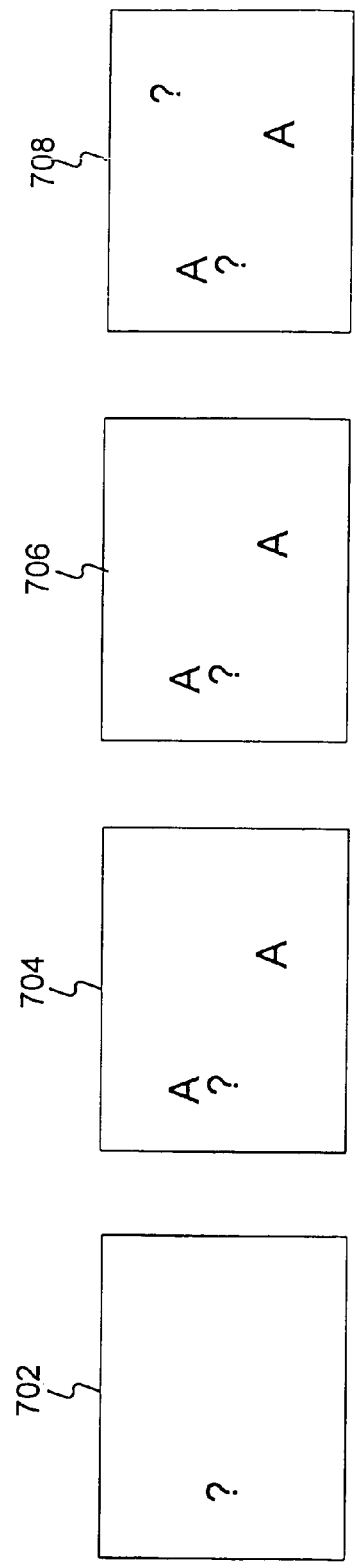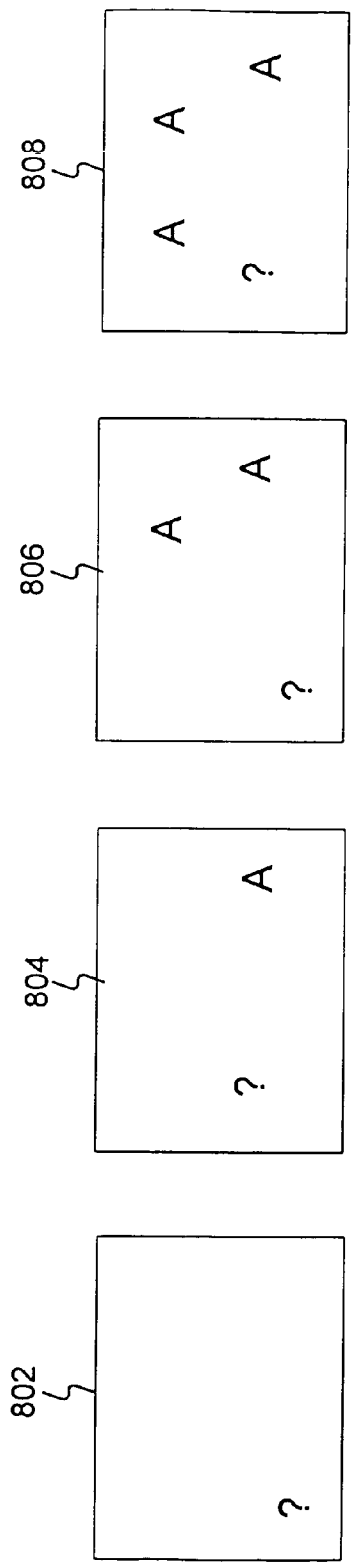

US 6,988,248 B1

ANIMATED INDICATORS THAT REFLECT FUNCTION ACTIVITY OR STATE OF OBJECTS DATA OR PROCESSES

BACKGROUND OF THE INVENTION

The present invention relates generally to the representation and organization of information on a computer display, and, more particularly, to the animation of icons on a computer display.

Modern computer systems convey much of their information to the user through a graphical user interface (GUI). GUI implementations may vary, but nearly all GUIs allow objects, such as computer programs and data structures, to be represented by miniaturized graphical representations, called icons. These icons are small image bitmaps (e.g., 32 by 32 pixels) selected to represent the underlying computer program or data structure pictographically. For example, a word processing program may be represented by an icon of a pen. To activate the program, a user will select the corresponding icon with a pointing device such as a mouse.

Icons make it easier for users to identify programs or data structures simply by the shape and appearance of the icons. Due to their small size relative to the size of the display screen, many icons can be displayed at one time. Icons can also generally be moved to any location on the display screen, thereby optimizing the area available for the display of information.

Although most conventional icons are static, some have been animated. Generally, animated icons are displayed by changing the icon image over time to produce an illusion of motion. Icon animation removes the limitation of using only a fixed array of pixels for an icon image while maintaining a small size on the computer display. Animated icons have been used to allow the user to associate the icon more easily with its functionality.

Conventional animated and static icons, however, show relatively little information about the objects they represent. For example, although they inform the user of the general functionality of the object represented, they fail to inform the user of the amount or quality of the data manipulated by the objects: they do not contain much information about the particular state of the object they represent.

Thus, there is a need for condensed graphical representations of computer objects, data, or processes that efficiently convey more information about its functionality and/or state.

SUMMARY OF THE INVENTION

A software "container" is represented by an icon-sized area on a computer display screen. An animated presentation, keyed to the objects of the software container, is displayed in the icon sized area. The animated presentation is modified as objects of the container change.

The advantages and purposes of this the invention will be set forth in the following description and will also be obvious from the description, or may be learned by practicing the invention. The advantages and purpose of the invention will be realized and attained by means of the elements and combinations particularly pointed out in the appended claims.

A process consistent with this invention for displaying an indicator of the state of a software container having a plurality of objects comprises the steps of (1) generating a series of frames, each of the frames containing information about the container; (2) cyclically displaying the series of frames in an animated sequence; and (3) modifying the series of frames to reflect a changed state of the container.

Both the foregoing general description and the following detailed description are exemplary and explanatory only and do not restrict the invention, as claimed.

BRIEF DESCRIPTION OF THE DRAWINGS

The accompanying drawings, which are incorporated in and constitute a part of this specification, illustrate embodiments of the invention and, together with the description, help to explain the principles of the invention. In the drawings.

FIGS. 5, 6, 7, and 8 are a series of diagrams showing a complete animation cycle corresponding to a software container.

DETAILED DESCRIPTION

Reference will now be made in detail to the embodiments of the invention, examples of which are illustrated in the accompanying drawings. Wherever possible, the same reference numbers will be used throughout the drawings to refer to the same or like parts.

The following description involves software containers and animated indicators. A software container or, more simply, a container, is a representation of one or more objects. An object is an entity, such as a program, that has state and functionality. For example, a container may be a world wide web page with pointers to a variety of discussion forums in which users may post questions, respond with answers, and respond with comments. Each of the forums would be an object in the world wide web page container. The functionality of each forum could be the topic of the forum and the organization of the postings, and the state of each forum could be the actual postings.

An animated indicator displays a graphical animation on the computer screen that represents a software container. Relative to the whole computer display, the graphical display is small (e.g., 32 by 32 pixels) and its position on the computer screen may be adjusted by the user. Preferably, the animation of the animated indicator is achieved by serially superimposing images in a manner to suggest movement. The particular animation sequence is keyed to the software container represented, and may change as parameters of the software container change.

Animated indicators graphically reflect the state of the container, potentially including information such as amount, type, and activity of the container. As the state of the container changes, the animation routine may change accordingly. In this manner, users are presented with up-to-date and detailed information about a container represented by a small graphic pictorial. Thus, the user receives a continuous supply of useful information about the container without having to specifically select and view the container as a full screen representation.

Figure 1:
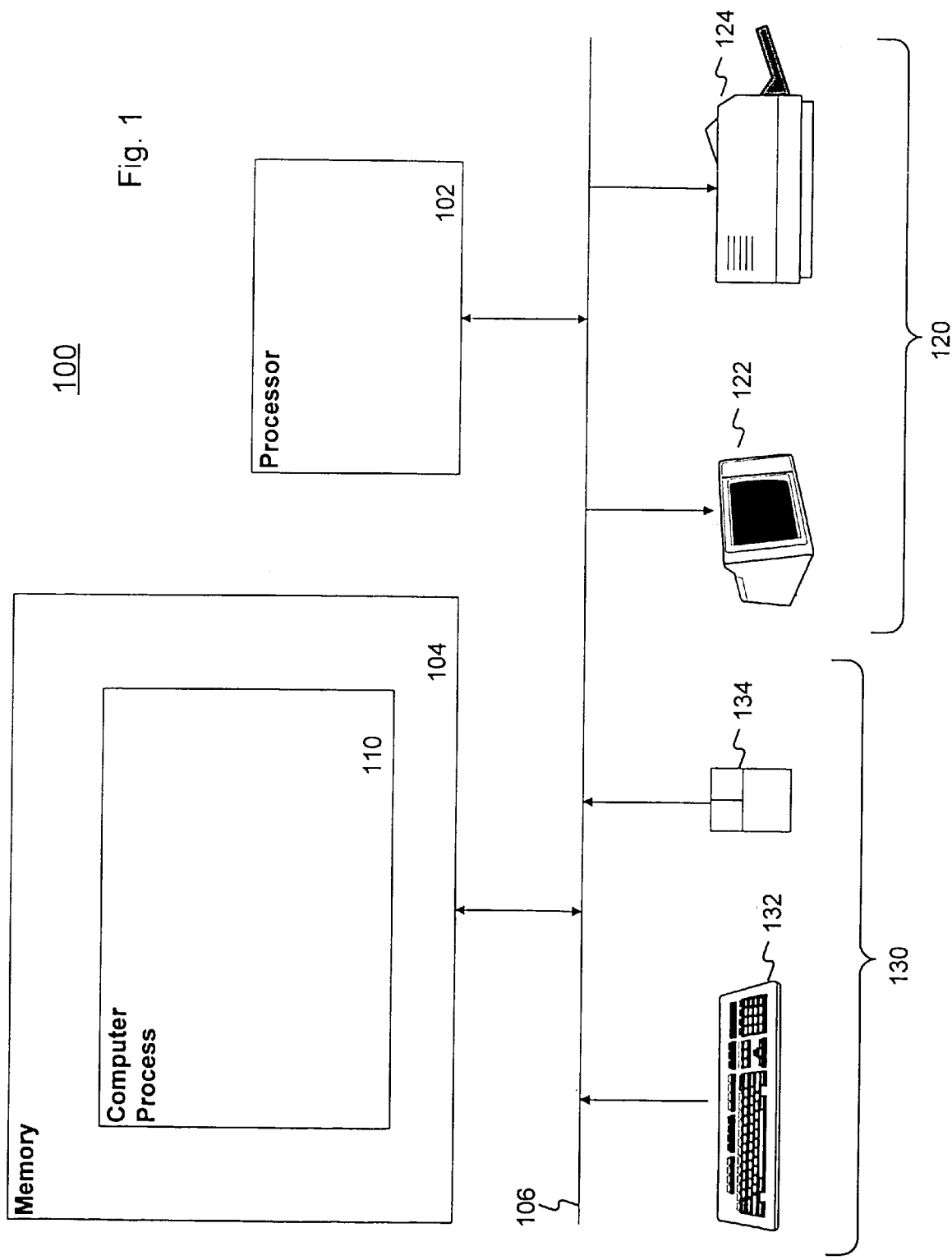
FIG. 1 is a block diagram of a computer system with which systems and methods consistent with the present invention may be implemented.

FIG. 1 is a block diagram of an exemplary computer system to display animated indicators. Computer system 100 includes a processor 102 and a memory 104 coupled to processor 102 through a bus 106. Processor 102 fetches computer instructions from memory 104 and executes those instructions. Processor 102 also (1) reads data from and writes data to memory 104, (2) sends data and control signals through bus 106 to one or more computer output devices 120, and (3) receives data and control signals through bus 106 from one or more computer user input devices 130 in accordance with the computer instructions.

Memory 104 can include any type of computer memory, including, without limitation, random access memory (RAM), read-only memory (ROM), and storage devices that include storage media such as magnetic and/or optical disks. Memory 104 includes a computer process 110, that processor 102 executes. A computer process in this description is a collection of computer instructions and data that collectively define a task performed by computer system 100.

Computer output devices 120 can include any type of computer output device, such as a printer 124, a cathode ray tube (CRT) 122, a light-emitting diode (LED) display, or a liquid crystal display (LCD). CRT display 122 preferably displays the animated indicators of the present invention. Each of computer output devices 120 receives from processor 102 control signals and data and, in response to such control signals, displays the received data.

User input devices 130 can include any type of user input device such as, a keyboard 132, a numeric keypad, or a pointing device such as an electronic mouse 134, a trackball, a lightpen, a touch-sensitive pad, a digitizing tablet, thumb wheels, or a joystick. Each of user input devices 130 generates signals in response to physical manipulation by a user and transmits those signals through bus 106 to processor 102.

Figure 2:
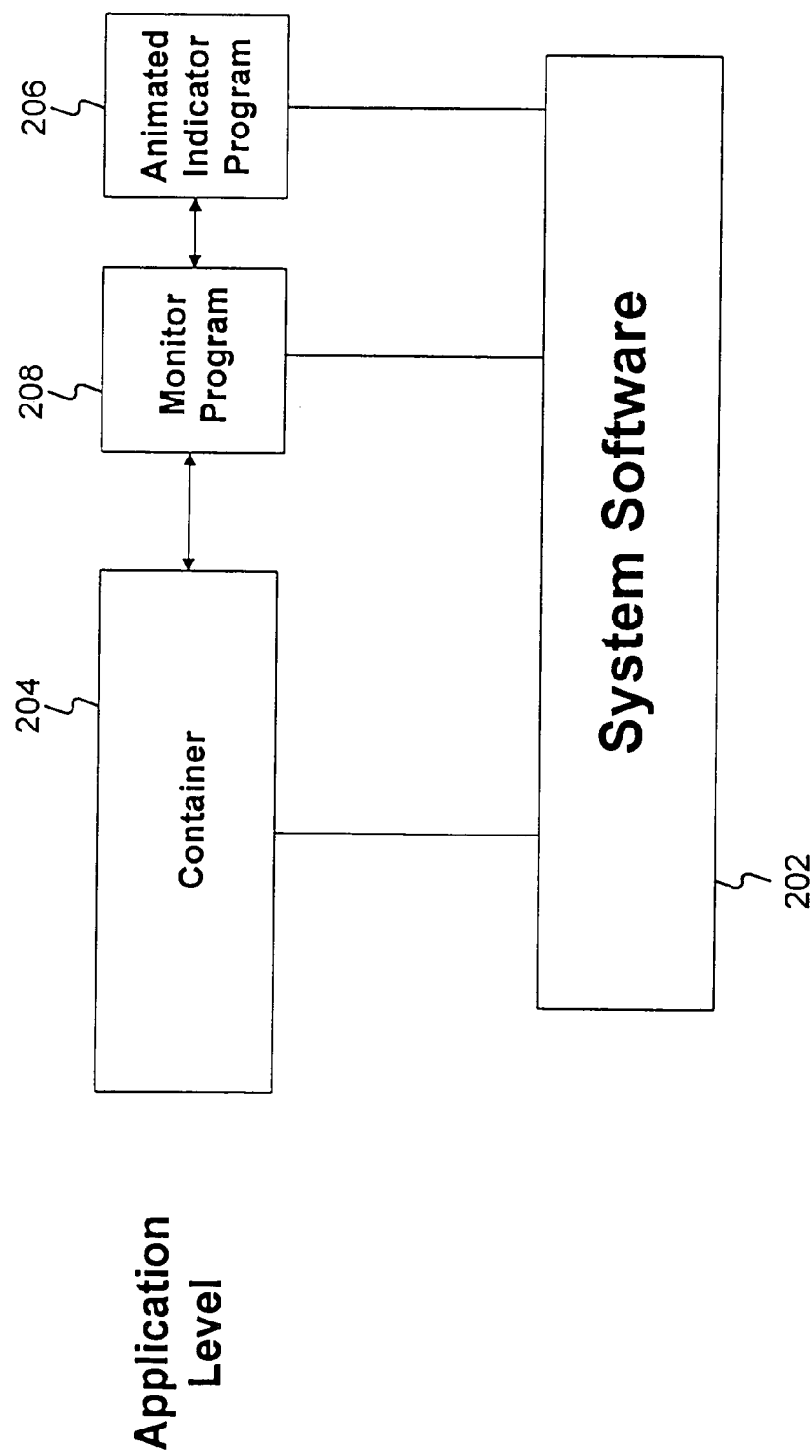
FIG. 2 is a high level diagram showing the software organization of the computer system shown in FIG. 1.

FIG. 2 is a high level diagram showing the general software organization of computer system 100 according to the present invention. System software 202 interfaces application programs, such as container 204 and animated indicator program 206, with the hardware of computer system 100. Animated indicator program 206 controls the animation sequence of animated indicators. Monitoring program 208 watches container 204 and informs animation program 206 of pertinent changes in the state of objects in container 204. In response to changes indicated by monitor 208, animated indicator program 206 may accordingly modify the animation. Although monitor 208 and animated indicator program 206 are shown in FIG. 2 as two distinct programs, they could alternatively be implemented as a single program including sub-routines to execute the monitor and animation functions. Yet another possible alternative is to implement the monitoring function within the code of container 204 or even within the code of system software 202.

Although any computer operating system and GUI may be used to implement the present invention, a preferred implementation is in Java on a Java virtual machine.

Figure 3:
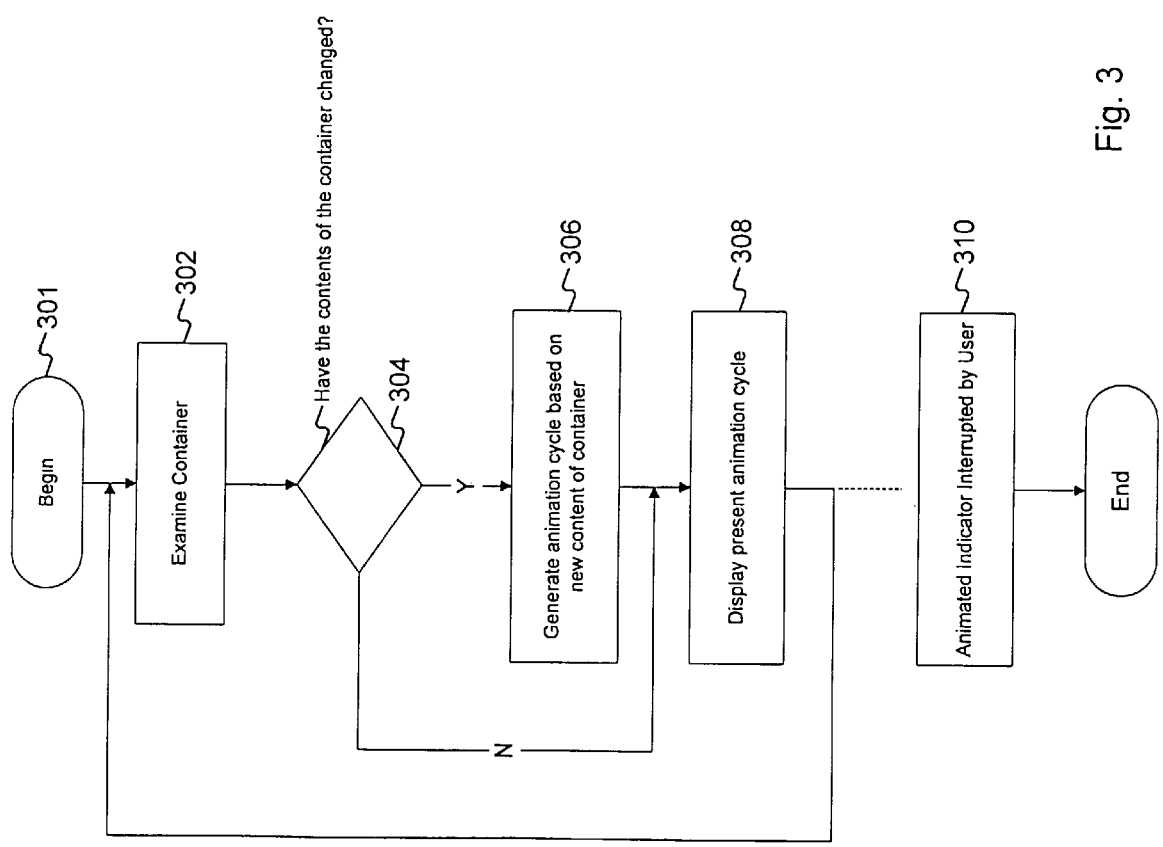
FIG. 3 is a flowchart showing the logic flow of an animated indicator program consistent with the present invention.

FIG. 3 is a flowchart showing the logic flow of animated indicator program 206 according to the present invention. Typically, the display of a particular animated indicator is initiated by a user action such as minimizing a container (step 301). Animated indicator program 206, through monitor program 208, examines container 204 and determines whether its state has changed enough to warrant a revised animation cycle (steps 302 and 304). If so, the animated indicator program causes the animated indicators to undergo a new animation cycle (i.e., a series of frames serially displayed and cycled to create animation) (step 306) and displays the cycle (step 308). Otherwise, the previous cycle is maintained (step 308). Any time during steps 302, 304, 306, and 308, the user may terminate the animated indicator program by, for example, clicking on the animated indicator with a mouse (step 310).

Figure 4:
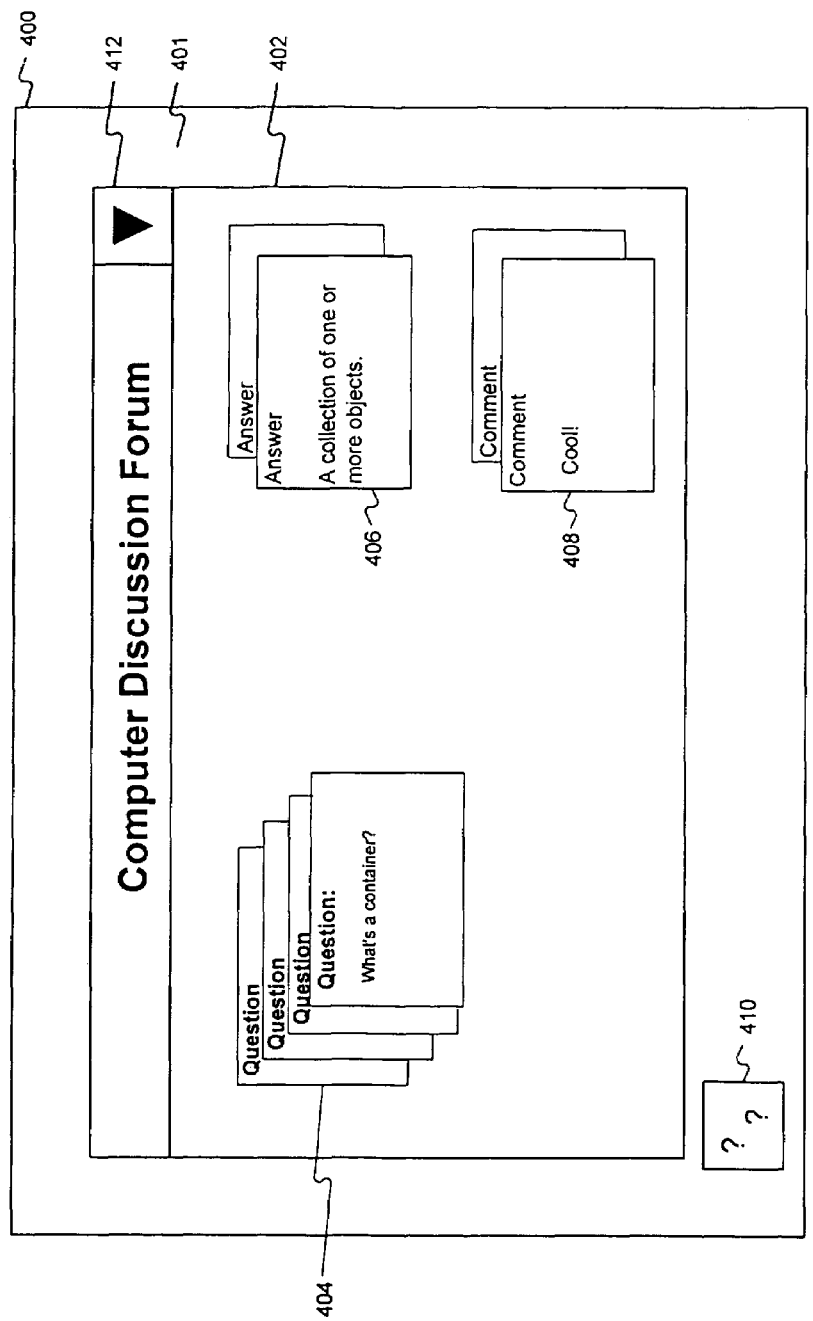
FIG. 4 is a diagram of a computer display screen showing an exemplary software container.

As previously discussed, the animated indicator program according to the present invention reflects the state of containers. FIG. 4 is a diagram of a computer display screen 400 showing an exemplary container 402 in its maximized, or large screen, form. Other than container 402, display 400 shows a background area 401 and an animated indicator 410, which represents a second container.

Figure 5:
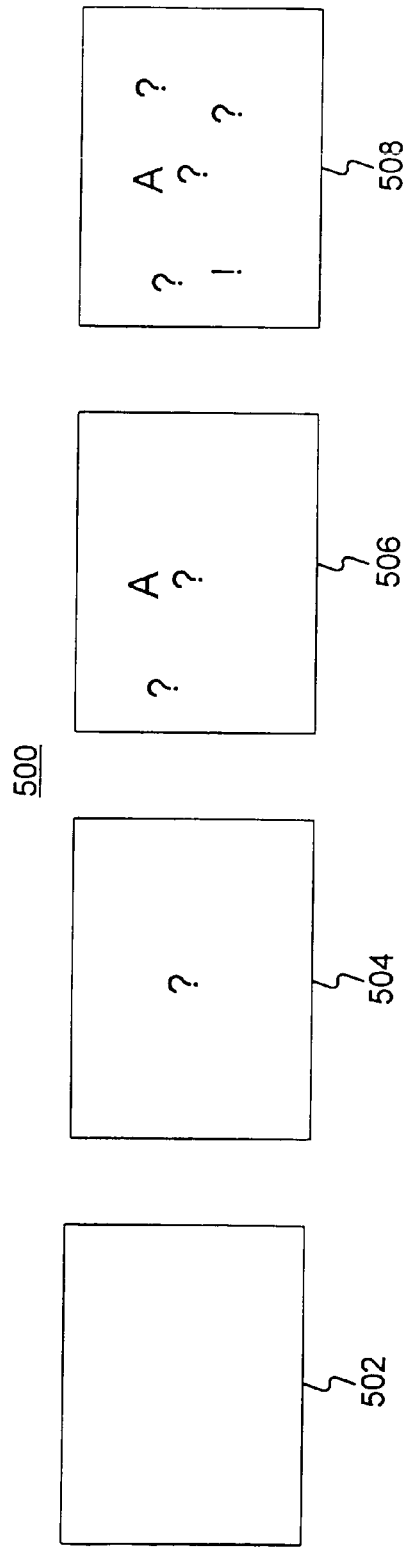
Figure 6:
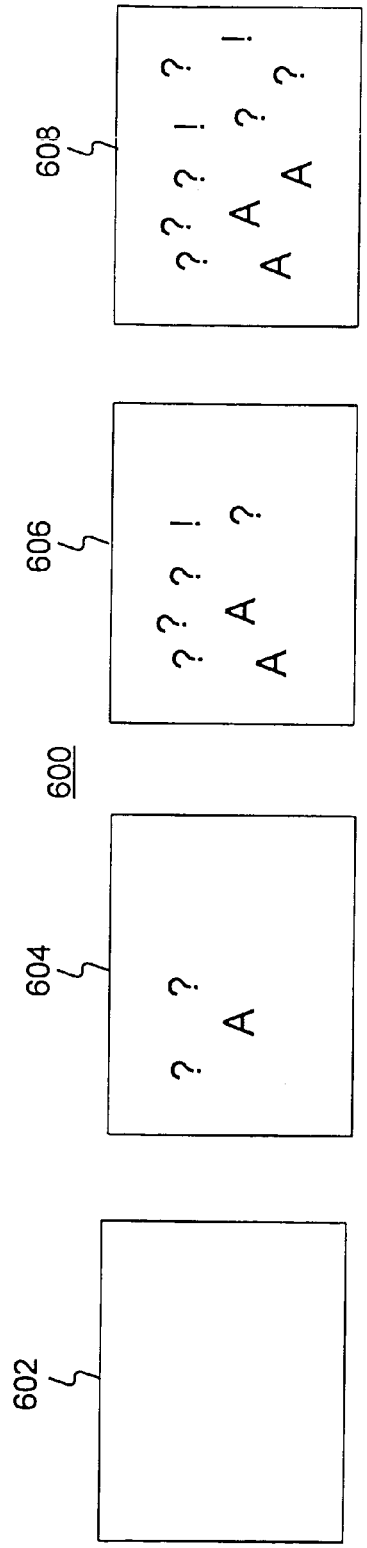

Container 402 is considered active, which means that the user may interact with its functions. Container 402 is shown as a discussion forum in which users may post questions, answers, and comments. Posted questions are added to the pile of question cards 404, posted answers are added to the answer pile 406, and posted comments are added to the comment pile 408. When the user activates button 412 with a pointing device, container 402 transforms into its corresponding animated indicator, such as an animated indicator similar to animated indicator 410. The general control and functions of the GUI interface shown in FIG. 4, including container 402, will not be described further as GUIs are well known. FIGS. 5 and 6 show specific examples of animations generated by an animated indicator representing container 402.

FIG. 5 is a series of diagrams showing a complete animation cycle 500 corresponding to container 402. Animation cycle 500 includes four distinct frames that appear in succession and are preferably displayed cyclically. While it is difficult to get a sense of the animation from the static representation shown in FIG. 5, one should imagine the animation flowing smoothly through frames 502, 504, 506, and 508. Further, although four stages of animation are shown, the number of stages per animation cycle may be changed to optimize any particular animation cycle.

In frame 502, the animated indicator is blank. In frame 504, a question mark appears in the animated indicator, indicating at least one question has been posted. In frame 506, a second question mark and an "A," indicating an answer post, are shown. Finally, in frame 508, two more question marks and an exclamation mark are added corresponding to the two final question posts and the comment post, respectively, in container 402. The animated indicator program may display the whole sequence of four frames in, for example, two seconds. After the last frame, 508, has been displayed, the animated indicator begins the display cycle again at frame 502. If additional questions, answers, or comments are added between cycles, animated indicator program 206 may update the new series of frames to reflect this by changing the number of question, answer, and comment indicators. Thus, the animation cycle shown in FIG. 5 informs the user of the number of objects and the nature of the objects in container 402.

FIG. 6 is a series of diagrams showing a complete animation cycle 600, representing container 402 modified to include six questions, three answers, and two comments. Animation cycle 600 includes frames 602, 604, 606, 608 and is similar to animation cycle 500. Here, however, the frames reflect the increased content of container 402. As the number of questions, answers, and comments increases in container 402, it may be difficult for the user to count their precise number, but it will not usually be necessary to know the number of question, answer, and comment indicators in frame 608 to extract useful information from the frames. By qualitatively noting the rate of frame filling and the final number of indicators in frame 608, the user can generally judge the amount and type of objects in container 402.

Preferably, the transition between animation cycles, such as the transition from frame 508 to frame 502, is implemented with a smoothing graphic operation such as a dissolve or fade, that prevents the animated indicator and the display screen from appearing too busy.

Many variations of the animation cycles shown in FIGS. 5 and 6 are possible. For example, the animations could take a variety of forms, including varying the color, size, or shape of the graphic. Further, audio may be used to present even more information about the container. Still further, the update frequency of the animated indicator may vary according to the objects in the container. For example, an indicator for indicating one question could be a single question mark that slowly flashes on and off, while an indicator for several questions could be a question mark that flashes on and off at a higher frequency. Additionally, although the previously described embodiment of the invention illustrated animations with a one-to-one correspondence between the number of objects in the container and the number of items in the last frame of the animation cycle, this is not necessary. Each item in a frame of an animation cycle may represent multiple objects within the container, thus emphasizing the change in the number of objects in the container over time rather than the absolute number of objects in the container.

Although the above examples of animation of the animated indicators have predominantly concentrated on the amount and type of objects in a container, information concerning the activity, i.e., the temporal change of objects in the container, could also be given by the animated indicators. For example, the animated indicator could show how recently objects have been added to or deleted from the container, or the rate at which objects have been added to or deleted from the container.

FIG. 7 is a series of diagrams showing a complete animation cycle 700 demonstrating a sense of activity about the underlying container. The container may be similar to container 402. The animation assumes that the container has had questions and answers added to it according to the following: at time zero, one question added; at time 1, two answers added; at time four, one additional question added. The time periods may be, for example, a half of a second apart. As shown, animation cycle 700 reflects the activity of the container by correlating the addition of the questions and answers to when they were added to the container. In initial frame 702, one question corresponding to the question at time zero is added. In frame 704, two "As," corresponding to the two answers posted at time one, are added. Frame 706 is identical to frame 704, indicating a gap between the posting of the two answers (i.e., no posting occurred in time three), and the final answer posting, shown in frame 708.

Animation cycle 700 illustrates an animation cycle that, in addition to informing the user of the number and type of objects, also presents information relating to the changing state of the container (i.e., its activity). Many variations are possible on the activity information shown in animation cycle 700. For example, there may be 100 messages in a discussion thread, but only four created in the last two weeks. To show this, the update frequency of the animation frames may correspond to the frequency of only the items added within the last two weeks. Alternatively, color may be used to indicate age. For example, yellow question marks may indicate postings added over a week ago while green question marks indicate postings added within the past week.

Motion within an animation cycle could also be used to indicate the number, type, or activity of objects. For example, in an animation cycle similar to animation cycle 500 that informs the user of the number and nature of the objects in a container, a moving question mark could be added to indicate that the that particular question spurned the answers in the container.

Animation cycle 800, shown in FIG. 8, is an example of the use of motion in an animation cycle. In frame 802, a single question mark is present, indicating that a single question is present in the container. In frame 804, an answer has been posted in response to the question. The question mark in frame 804 is shifted from its position in frame 804, which will appear as motion to the user. In frames 806 and 808, the question mark continues to move while additional answers are added.

Further, although the animations shown in FIGS. 5 through 8 have been illustrated using a fixed number of frames per animation cycle, i.e., 4, the number of frames displayed per animation cycle may be any number suitable for displaying an effective animation sequence. Indeed, the animated indicator program may even dynamically add new frames to the animation cycle synchronously with a changing state of the container. For example, the animated indicator program could update the most recently displayed frame in the animation cycle by adding a single question, comment, or answer mark whenever a question, comment, or answer is posted to the animated indicator's container.

As discussed above, animated indicators according to the present invention continuously provide information about software containers even when the container is minimized. Thus, the system user may be able to perceive significant information from a container represented by a small spatial area. In particular, information regarding the type, amount, and activity of objects in the container can be quickly conveyed to the user.

It will be apparent to those skilled in the art that various modifications and variations can be made to the present invention without departing from the scope or spirit of the invention. For example, although animated indicators have been described using a container implementing a discussion forum, the indicators may represent a wide variety of containers, including, containers tracking e-mail discussion threads, summarizing news group discussions, monitoring multiple interactive chat discussions, or monitoring hits in a world wide web site hierarchy.

Other embodiments of the invention will be apparent to those skilled in the art from consideration of the specification and practice of the invention disclosed herein. The specification and examples are exemplary only. The true scope and spirit of the invention is instead indicated by the following claims and their equivalents.

What is claimed is:

1. A process for reflecting a state of a software container having objects, comprising:

cyclically displaying a series of frames reflecting a state of the container as an animated sequence;

detecting an event reflecting a change in the state of the container, wherein the container implements a discussion forum;

determining, based on the detected event, whether an animated sequence does not reflect the state of the container;

and updating the cyclical display based on the determination, wherein the cyclical display reflects the numbers and types of the objects, and the cyclical display uses color variations, tempo, motion, and change in size to reflect the number or type of the objects in the container.

2. A computer system comprising:

a memory including a software container and an animated indicator program, the animated indicator program including computer code for:

monitoring the software container to detect an event reflecting a change in a state of the container, wherein the container implements a discussion forum;

determining, based on the detected event, whether an animated sequence does not reflect the state of the container; and generating a series of frames to reflect a state of the container based on the determination;

a display on which a series of frames is cyclically displayed in an animated sequence; and a processor configured to execute programs in the memory, wherein the cyclical display reflects the number and type of objects of the container, and the animated indicator program further includes computer code for using color variations, tempo, change in size, and motion to reflect the number or type of the objects in the container.

3. A computer readable medium, containing instructions executable on a computer, the instructions when executed on the computer performing the steps of:

cyclically displaying a series of frames in an animated sequence such that the animated sequence reflects a state of a software container;

detecting an event reflecting a change in the state of the container, wherein the container implements a discussion forum;

determining, based on the detected event, whether an animated sequence does not reflect the state of the container; and updating the cyclical display based on the determination, wherein the instructions for the cyclical display causes the cyclical display to reflect the number and type of objects of the container, and further including instructions for using one of color variations, tempo, motion, and change in size to represent the degree of the change in the state of the container.

* * * * *